United States Patent [19]
Collins

[11] Patent Number: 5,184,569
[45] Date of Patent: Feb. 9, 1993

[54] ANIMATED WILD ANIMAL FEEDER

[76] Inventor: Clayton J. Collins, 2305 Sandalwood Cir. #204C, Ann Arbor, Mich. 48105

[21] Appl. No.: 930,261

[22] Filed: Aug. 14, 1992

[51] Int. Cl.$^5$ .............................................. A01K 5/00
[52] U.S. Cl. ..................................... 119/55; 446/167
[58] Field of Search ............... 119/55, 54, 52.1, 51.12; 446/167, 169, 217, 218; 222/164, 166, 463

[56]  References Cited
U.S. PATENT DOCUMENTS

| | | | |
|---|---|---|---|
| 1,518,144 | 12/1924 | Huggins | 446/167 |
| 2,419,990 | 5/1947 | Dishmaker | 446/169 |
| 2,681,169 | 6/1954 | Watson | 222/164 |
| 3,900,134 | 8/1975 | Larson | 222/463 |
| 4,147,133 | 4/1979 | Molnar et al. | 119/55 |

FOREIGN PATENT DOCUMENTS

| | | | |
|---|---|---|---|
| 51731 | 4/1890 | Fed. Rep. of Germany | 119/55 |
| 1212362 | 3/1960 | France | 119/55 |

*Primary Examiner*—Gene Mancene
*Assistant Examiner*—Todd E. Manahan
*Attorney, Agent, or Firm*—Peter D. Keefe

[57] ABSTRACT

A wild animal feeder which combines animal feeding with a decorative, fanciful shape and, further, is also animated by activity of the feeding animals, composed generally of a pair of fancifully shaped sidewalls, a feeder component situated between each of the sidewalls, a base, a pair of legs connected with the base, and a pivot structure for providing selected pivoting movement of the sidewalls and feeder component with respect to the legs. The pivot structure cooperates with an actuator which provides pivoting of the feeder component and the sidewalls whenever an animal comes to feed. In this regard, the feeder component includes a feed holder, an access door to the feed holder, a feed dispenser located adjacent the generally forward end of the sidewalls, and a dispensing opening in the feed holder for passing feed from the feed holder to the feed dispenser whenever the feeder component is pivoted. The feed dispenser may be equipped with a dual feed dispensing structure in which fine grained feed falls through one or more apertures and fine or coarse grained feed is dispensed via a trough, thereby serving birds and small land dwelling animals simultaneously.

20 Claims, 3 Drawing Sheets

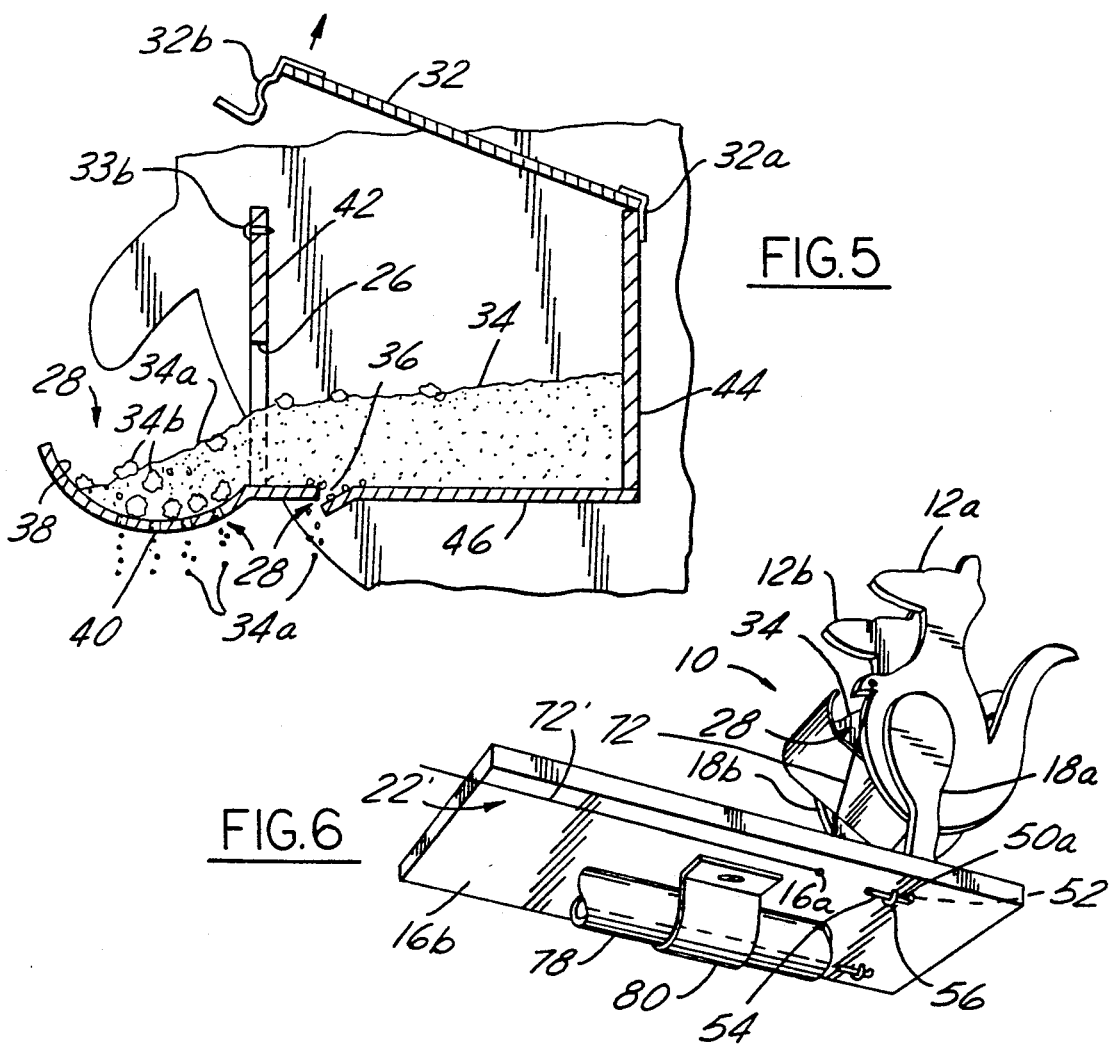

ANIMATED WILD ANIMAL FEEDER

BACKGROUND OF THE INVENTION

1. Field of the Invention

The present invention relates to wild animal feeders for birds and for small land dwelling animals, such as squirrels and the like. More particularly, the present invention relates to a wild animal feeder which supplies feed to the animals whenever an animal causes the feeder to pivot, the pivoting resulting in an animation of the feeder which enhances the enjoyment of the view of the feeding animals.

2. Description of the Prior Art

It is well known in the art that wild animal feeders can effectively entice animals to feed thereat, either for purposes of entertainment, education, animal welfare, and any combination thereof. One ubiquitous example of a wild animal feeder is a "birdhouse", which is essentially a box on a pole having bird feed depsoited therein for feeding of birds who are drawn thereto. Wild animal feeders, whether intended to feed birds or small land dwelling animals, are essentially inanimate containers for feed. Their innate attraction is essentially purely one of shape and color, which is ordinarily eclipsed by the movement and beauty of the wild animals they attract.

It is also well known in the prior art to provide fanciful lawn decorations which are structured to provide a pleasing ornamentation. An example of lawn decorations are wooden cut-outs of rabbits and other small wild animals; and another example are pin wheels which twirl in the wind on an axle supported on a vertical shaft that is anchored into the ground.

While each of the foregoing devices provides a structure which well serves its intended purpose, none provide a hybrid structure which combines functionalities to serve a variety of purposes simultaneously. Accordingly, what remains needed in the art is a device which combines animal feeding with a decorative, fanciful shape and, further, is also animated by activity of the feeding animals.

SUMMARY OF THE INVENTION

The present invention is a wild animal feeder which combines animal feeding with a decorative, fanciful shape and, further, is also animated by activity of the feeding animals.

The wild animal feeder according to the present invention is composed generally of a pair of fancifully shaped sidewalls, a feeder component situated between each of the sidewalls, a base, a pair of legs connected with the base, and a pivot structure for providing selected pivoting movement of the sidewalls and feeder component with respect to the legs.

Preferably the sidewalls have a fanciful shape and depiction thereon which is ornamentally pleasing, as for example the outline and appearance of an animal. The pivot structure cooperates with an actuator which provides pivoting of the feeder component and the sidewalls whenever an animal comes to feed. The feeder component includes a feed holder, an access door to the feed holder, a feed dispenser located adjacent the generally forward end of the sidewalls, and a dispensing opening in the feed holder for passing feed from the feed holder to the feed dispenser whenever the feeder component is pivoted. The feed dispenser may be equipped with a dual feed dispensing structure in which coarse and/or fine grained feed is dispensed by a trough and fine grained feed is dispensed through one or more apertures in the form of one or more slits, holes, or the like, thereby serving birds and small land dwelling animals simultaneously.

In operation, a wild animal actuates the actuator, ordinarily by standing on it, which thereby causes the sidewalls and feeder component to pivot toward the animal. Feed is then gravity fed to the feed dispenser for consumption by the animal or any adjacent animals. Alternatively, actuation may be manual or mechanical.

Accordingly, it is an object of the present invention to provide a wild animal feeder which provides feeding of birds and small ground dwelling animals, in which feed is selectively dispensed to the animals on a per use basis.

It is an additional object of the present invention to provide a wild animal feeder which has a fanciful, ornamental shape and appearance.

It is a further object of the present invention to provide a wild animal feeder which is animated each time feed is dispensed to the animals.

It is yet another object of the present invention to provide a wild animal feeder which has an easily replenished feeder component, the feeder component being structured to include a feed dispenser which dispenses feed to animals each time the feeder component is pivoted in response to an animal approaching the feeder component, or in response to manual or mechanical actuation.

It is still a further object of the present invention to provide a wild animal feeder which is animated each time feed is dispensed to the animals, wherein large and/or small grained feed is dispensed via a trough and fine grained feed is dispensed via one or more apertures in the form of slits, holes or the like.

These, and additional objects, advantages, features and benefits of the present invention will become apparent from the following specification.

BRIEF DESCRIPTION OF THE DRAWINGS

FIG. 5 is a partly sectional side view of the feeder according to the present invention.

FIG. 6 is a perspective view of a wild animal feeder as depicted in FIG. 1, now also showing a support structure for supporting the base above the ground.

DETAILED DESCRIPTION OF THE PREFERRED EMBODIMENT

Figure 1:
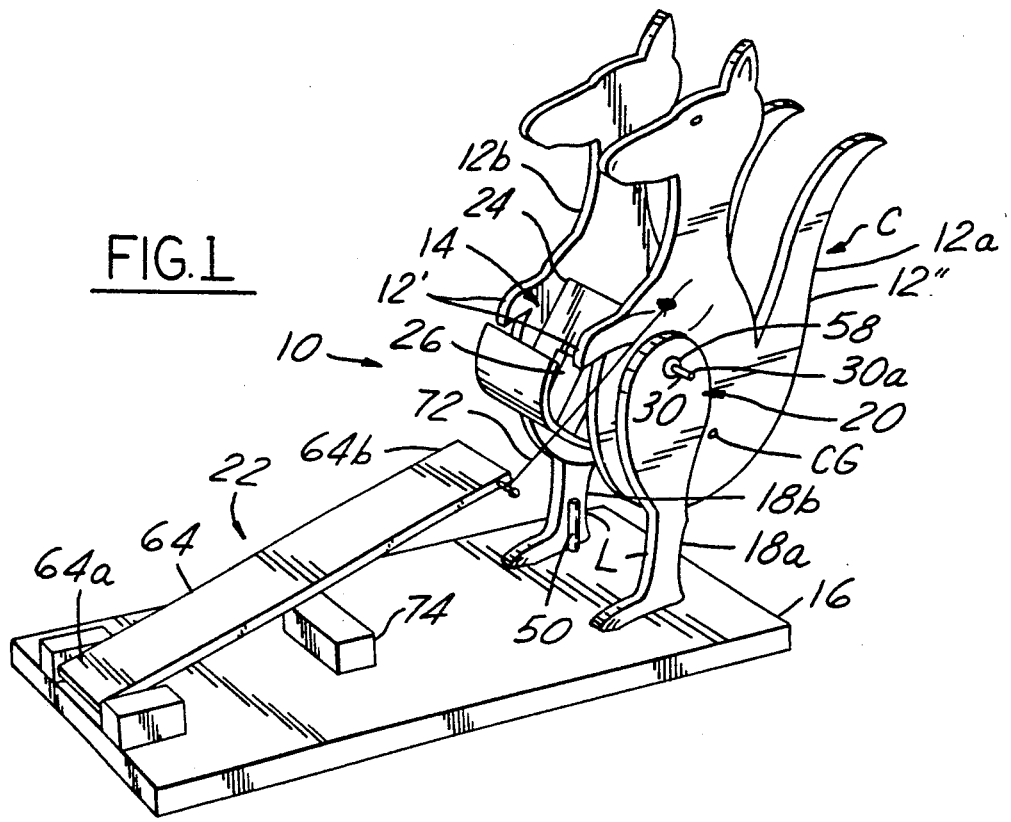
FIG. 1 is a perspective view of a wild animal feeder according to the present invention, shown in the nondispensing mode of operation.
Figure 2:
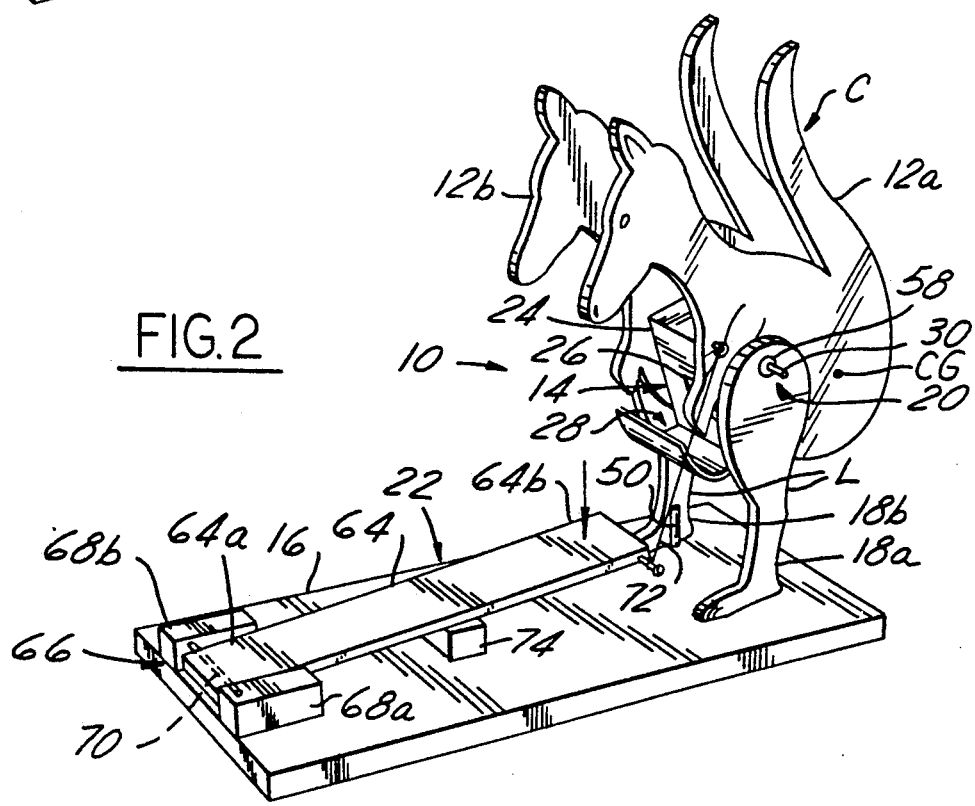
FIG. 2 is a perspective view of the wild animal feeder as shown in FIG. 1, now shown in the dispensing mode of operation.

Referring now to the Drawing, FIGS. 1 and 2 show the wild animal feeder 10 according to the present invention. In this regard, it will be seen that the animal feeder 10 is composed generally of a mutually aligned pair of fancifully shaped and ornamented sidewalls, a first sidewall 12a and a second sidewall 12b, a feeder component 14 situated between the sidewalls, a base 16, a pair of legs 18a, 18b connected with the base, a pivot structure 20 for providing selected pivoting movement of the sidewalls and feeder component with respect to the legs, and an actuator 22 for causing the pivoting of the sidewalls and feeder component when an animal approaches the feeder component in search of food, or when manually or otherwise mechanically actuated (see FIG. 6).

As can be seen by reference to both FIGS. 1 and 2, the wild animal feeder 10 may be selectively changed from being in a nondispensing mode of operation, as shown in FIG. 1, to a dispensing mode of operation, as shown in FIG. 2. In the nondispensing mode of operation, feed is contained and sheltered in a feed holder 24. In the dispensing mode of operation, feed is gravity fed through a dispensing opening 26 in the feed holder 24 to a feed dispenser 28 whereat the feed may be consumed by the animal.

In order to bias the wild animal feeder 10 from the dispensing mode of operation to the nondispensing mode of operation, a biasing mechanism is provided. The preferred biasing mechanism is gravitational in nature, in which the center of gravity CG of the combination of the sidewalls 12a, 12b and of the feeder component 14 is positioned rearwardly with respect to, and beneath, an axle 30 of the pivot structure 20 so as to provide a gravitational moment arm therebetween in which the sidewalls 12a, 12b and the feeder component 14 tend to naturally pivot by force of gravity into the orientation shown in FIG. 1 in which the wild life feeder 10 is in the nondispensing mode of operation. (Note in this regard that the center of gravity CG shown in FIGS. 1 and 2 is shown schematically on sidewall 12a for the purpose of showing the relative separation between it and the axle 30; the actual center of gravity would, of course, by located somewhere between the two sidewalls 12a, 12b.) When the actuator 22 is actuated, the sidewalls 12a, 12b and the feeder component 14 pivot with respect to the axle 30 so that the center of gravity moves away from the base 16 and the feed dispenser 28 moves toward the base, as the wild animal feeder 10 goes from the nondispensing mode of operation to the dispensing mode of operation. The details of how this is accomplished are elaborated hereinbelow.

The sidewalls 12a, 12b are preferably constructed of planar material, which may be, for example wood, metal or plastic. Preferably, the sidewalls 12a, 12b are cut into a shape depicting a selected characterization C, such as an animal. Further, it is preferred that the sidewalls 12a, 12b be painted or otherwise decorated so as to enhance the appearance of the selected characterization C. The sidewalls 12a, 12b mutually have a generally forward end 12' and a generally rear end 12".

Situated between the sidewalls and connected therewith is the feeder component 14. As can be seen also with respect to FIGS. 3 and 5, the feeder component 14 includes a feed holder 24, an access door 32 to the feed holder, a feed dispenser 28 located more-or-less adjacent the generally forward end 12' of the sidewalls 12a, 12b, and a dispensing opening 26 in the feed holder for passing feed 34 from the feed holder to the feed dispenser whenever the feeder component 14 is pivoted. Preferably, the feed holder 24 is situated between the generally forward and generally rear ends 12', 12" of the sidewalls 12a, 12b so that it is not readily viewable to a bystander who is looking at the wild animal feeder 10 from the side.

The feed holder 24 is defined by the sidewalls 12a, 12b, a front wall 42 having the dispensing opening 26, a rear wall 44, and a bottom 46. Each of the front and rear walls 42, 44 are connected to the sidewalls 12a, 12b, and the bottom may be attached to the sidewalls, the front and rear walls, or a combination thereof. Preferably, the feed dispenser 28 is in the form of a trough 38 which enables coarse and/or fine grained feed to be accessible to one or more animals for purposes of consumption. The feed dispenser 28 may be equipped with a dual feed dispensing structure, in which in addition to feed dispensing by the trough 38, fine grained feed 34a is dispensed through one or more apertures in the form of either one or more bottom slits 36, a plurality of holes 40, or the like, any of which being in the bottom 46 or in the trough 38. With this structure, feed is dispensed simultaneously to both birds and small land dwelling animals, such as squirrels.

Figure 3:
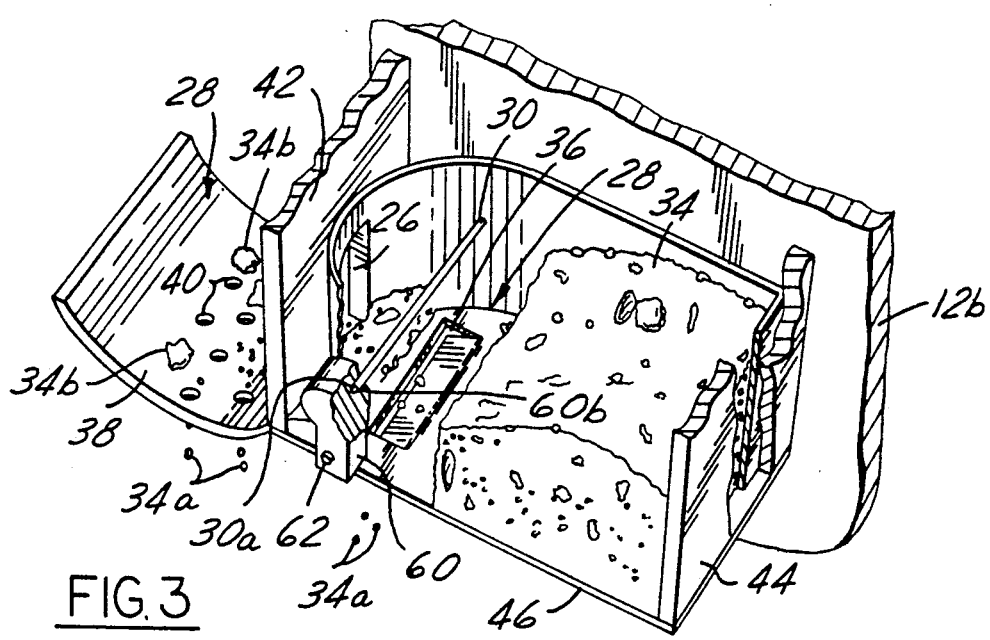
FIG. 3 is a partly sectional perspective view of the feeder component according to the present invention.

As shown in FIG. 3, it is preferable to include an interior wall 48 within the feed holder 24 which is curved at its forward end adjacent the dispensing opening 26 so as to aid feed 34 to pass out of the feed holder through the dispensing opening and to the trough 38 of the feed dispenser 28 when the wild animal feeder 10 is in the dispensing mode of operation; however, inclusion of an interior wall is not a requirement, as shown in FIG. 5. The access door 32 is preferably connected by a hinge 32a with one of the front and rear walls 42, 44 (the rear wall being preferred), and is releasably held by a snap latch mechanism 32b to the other of the front and rear walls or otherwise secured thereto (the latch mechanism shown in FIG. 5 being partly connected with the access door and partly connected to the front wall 42). Opening of the access door 32 permits a user to periodically replenish the feed 34, while the feed is kept reasonably sequestered from exposure to the elements, particularly rain and snow.

The legs 18a, 18b are perpendicularly connected with the base 16. As further depicted in FIG. 6, preferably each leg 18a, 18b is connected to the base 16 by a rigid wire 50 passing through a hole 52 in the base, an end portion 50a of which being bent into a slot 54 in the base bottom 16b and then secured thereinto by one or more staples 56. Of course, other connection structures, such as glued in place wooden dowels instead of the rigid wires 50, will be apparent to those of ordinary skill in the art, and such modifications are within the contemplation of the present invention.

Figure 4:
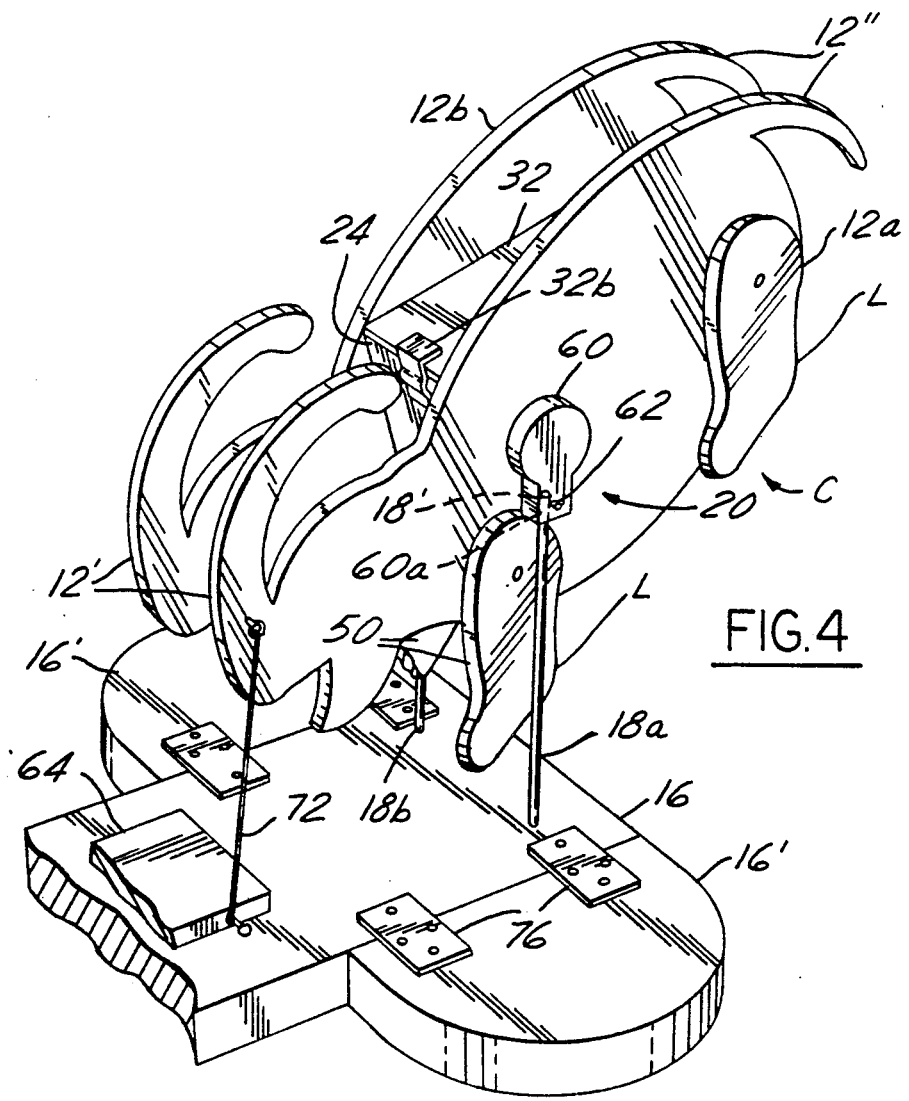
FIG. 4 is a perspective view of a wild animal feeder according to the present invention having a different mounting arrangement and fanciful appearance from that depicted in FIG. 1, shown in the dispensing mode of operation.

The rigid wires 50 may serve as the legs 18a, 18b, as shown in FIG. 4. In this case, the selected characterization C may or may not have character legs L which interact with the rigid wires 50. Indeed, the character legs L of the selected characterization C may be pivotally connected with respective sidewalls 12a, 12b (which may or may not include the axle 30), as shown in FIG. 4, or may be pivotally connected with the axle 30 so that they rock in a visually pleasing manner whenever the sidewalls 12a, 12b are pivoted. An example of characterization legs L of the selected characterization C serving as legs 18a, 18b which are, in turn, suitably interconnected with the rigid wires 50 is shown in FIGS. 1 and 2.

The pivot structure 20 is composed of the axle 30, preferably in the form of a wire that is rigid (structurally not unlike the rigid wires 50), which extends between and beyond the sidewalls 12a, 12b. The extending portion 30a thereof interconnects with the legs 18a, 18b. One form of interconnection is shown in FIGS. 1 and 2, in which the extending portion 30a of the axle 30 passes through a hole in each of the legs 18a, 18b and is retained thereat by a press-fit washer 58 adjacent each leg 18a, 18b. In this regard, as mentioned hereinabove, it is important for proper functioning of the wild animal feeder 10 that biasing toward the orientation characteristic of the nondispensing mode of operation be provided. In this regard, since the axle 30 is located so that the center of gravity CG is positioned below (toward the base 16) and behind (toward the generally rear end 12" of the sidewalls) the axle when the wild animal feeder 10 is in the nondispensing mode of operation, as shown in FIG. 1, a gravitational moment arm is present which supplies the necessary biasing.

A pivot structure 20 which is used in the event the legs 18a, 18b are in the form of rigid wires 50 is shown in FIGS. 3 and 4. In this case, a mounting block 60 is employed adjacent each of the sidewalls 12a, 12b. Each mounting block 60 has a leg bore 60a into which an upper end 18' of the legs 18a, 18b is respectively received. A set screw 62 secures each upper end 18' into its respective leg bore 60a. An axle bore 60b in each mounting block 60 receives a respective extending portion 30a of the axle 30, thereby providing a pivot point on which the sidewalls 12a, 12b and the associated feeder component 14 can pivot with respect to the base 16.

The actuator 22 is preferred to be in the form of a platform 64 which is hingably connected at a forward end 64a thereof to the base 16 at a location distant from the legs 18a, 18b and is flexibly connected at a rear end thereof 64b to at least one of the sidewalls 12a, 12b and the feeder component 14. In this regard, a hinge 66 is constructed from two base blocks 68a, 68b, each connected with the base 16 on either side of the platform 64, and a hinge pin 70 which passes through the forward end 64a of the platform 64 and passes into each of the two base blocks 68a, 68b. Of course, it will be apparent to those of ordinary skill in the art to devise alternative hinges 66, such as a rope connecting the forward end of the platform to the base, and these are contemplated within the scope of the present invention. The rear end 64b of the platform 64 is aligned with the feed dispenser 28 and is connected to at least one of the sidewalls 12a, 12b and the feeder component by a string 72 or some other similarly functioning member. A spacer block 74 may or may not be placed between the platform 64 and the base 16 for purposes of regulating movement of the platform with respect to the base. As mentioned hereinabove, the location of the center of gravity CG with respect to the axle 30, causes the sidewalls 12a, 12b and the feeder component 14 to tend to pivot so that the center of gravity will be gravitationally biased toward becoming vertically aligned with the axle. The actuator 22 is structured so that the platform 64 and the string 72 keep the center of gravity both behind and below the axle (that is non-vertically aligned), as shown in FIG. 1, when the wild animal feeder is in the nondispensing mode of operation.

As mentioned hereinabove, the feed dispenser having one or more apertures provides for fine grained feed 34a to be distributed onto the base 16. In this regard, side extensions 16' may be added to the base 16 so that the fine grained feed falls onto the base and not onto the ground. Connection of the side extensions 16' to the base 16 may be by any suitable structure, a releasable connection structure 76 being preferred.

As shown in FIGS. 1 and 2, a common operational mode for the base 16 is to simply rest it upon the ground. As shown in FIG. 6, another operational mode for the base is to connect it with a mounting structure 78 via a mounting bracket 80. The mounting structure may be a projection from a window sill or railing, a projection from a mast, or any other structure which supports the base 16 off the ground.

In operation, the base is placed at a location in which the user can enjoy its operation in connection with wild animal feeding therefrom. The access door is opened and feed is placed into the feed holder. When a wild animal approaches the wild animal feeder because it sees or smells the feed, the animal will step upon the platform. The weight of the animal will then cause the pair sidewalls and feeder component to pivot on the axle, thereby dispensing feed to the trough and, if included, via the one or more apertures. The movement of the wild animal feeder combined with the movement of the wild animal thereat, will provide enormous enjoyment to any person viewing the scene.

An alternative actuator 22' does not utilize the platform. Rather, the string 72 continues through a hole 16a in the base 16 and continues along a portion thereof 72' to a remote location where it is selectively pulled either manually or mechanically, the latter by any mechanism well known in the art to provide such a movement.

As indicated hereinabove, the actuator includes structure for defining the orientation of the sidewalls 12a, 12b when the wild animal feeder 10 is in the nondispensing mode of operation. This may involve, for example, a specific length of the string 72, 72' in relation to its attachment locations, may involve a stop boss which interferingly engages with respect to a leg 18a, 18b and a respective sidewall 12a, 12b, or some other orientation defining structure within the ordinary ken of an artisan.

The wild animal feeder can be provided not only in a completed form, but can also be provided in a kit form for assembly, with or without parts fabrication, by the user.

To those skilled in the art to which this invention appertains, the above described preferred embodiment may be subject to change or modification. For instance, the biasing of the sidewalls and feeder component may be by a gravitational moment arm, a spring or other resilient mechanism well known in the art, or any combination thereof. Such change or modification can be carried out without departing from the scope of the invention, which is intended to be limited only by the scope of the appended claims.

What is claimed is:

1. A wild animal feeder, comprising:
   an aligned pair of sidewalls comprised of a first sidewall and a second sidewall, said pair of sidewalls having a generally forward end and a generally rear end;
   a feeder component situated between said first and second sidewalls and connected with respect thereto, said feeder component comprising:
   a feed holder for holding a quantity of feed, said feed holder having an access door for providing selective access to the feed holder in order to periodically replenish the feed, said feed holder having a front wall, a rear wall and a bottom each of which at least substantially connecting with said first and second sidewalls, said front wall being provided with a dispensing opening; and feed dispensing means located substantially adjacent said generally forward end of said pair of sidewalls for dispensing the feed from said feed holder, at least a portion of the feed passing through said dispensing opening, so as to be accessible for being eaten by one or more adjacent wild animals;

axle means connected with said aligned pair of sidewalls for providing a pivot for said pair of sidewalls and said feed holder component;

a base;

a pair of legs connected with said base and substantially perpendicularly oriented with respect thereto; one leg of said pair of legs connecting with said axle means adjacent said first sidewall, the other leg of said pair of legs connecting with said axle means adjacent said second sidewall;

actuator means connected with at least one said pair of sidewalls and said feeder component for causing said pair of sidewalls and said feeder component to pivot on said axle means in response to actuation thereof; and bias means for urging said pair of sidewalls and said feeder component to assume a first orientation, defined by said actuator means, in which feed is not dispensed from said feed holder to said feed dispenser in response to gravity; wherein further, actuation of the actuator means causes said pair of sidewalls and said feeder component to pivot on said axle means to a second orientation in which feed is dispensed from said feed holder to said feed dispenser in response to gravity.

2. The wild animal feeder of claim 1, wherein said bias means comprises said pair of sidewalls and said feeder component collectively having a center of gravity located with respect to said axle means so as to provide a moment arm therebetween with respect to gravity which biases said pair of sidewalls and said feeder component toward said first orientation from said second orientation.

3. The wild animal feeder of claim 2, wherein said actuator means comprises string means connected with at least one of said pair of sidewalls and said feeder component for being selectively pulled, said pair of sidewalls and said feeder component assuming said first orientation as a result of said biasing means when said string means is not selectively pulled, and said pair of sidewalls and said feeder component pivoting on said axle means to said second orientation when said string means is selectively pulled.

4. The wild animal feeder of claim 3, wherein said actuator means further comprises a platform having a forward end and a rear end, said forward end of said platform being pivotally connected to said base at a location remote from said generally forward end of said pair of sidewalls, said forward and rear ends of said platform being in alignment with respect to said generally forward end of said pair of sidewalls, said string means being connected with said rear end of said platform, said platform and said string means being mutually structured so that said pair of sidewalls and said feeder component assume said first orientation as a result of said biasing means when said platform is not depressed toward said base yet a wild animal placing at least a portion of its weight upon said platform causes said platform to depress toward said base so that said pair of sidewalls and said feeder component pivot on said axle means to said second orientation.

5. The wild animal feeder of claim 3, wherein said feed dispensing means comprises trough means located substantially adjacent said generally forward end of said pair of sidewalls for holding the feed accessibly for one or more wild animals to eat.

6. The wild animal feeder of claim 5, wherein said feed dispensing means further comprises aperture means for dispensing therethrough small grained feed accessibly for one or more wild animals to eat.

7. The wild animal feeder of claim 6, wherein said actuator means further comprises a platform having a forward end and a rear end, said forward end of said platform being pivotally connected to said base at a location remote from said generally forward end of said pair of sidewalls, said forward and rear ends of said platform being in alignment with respect to said generally forward end of said pair of sidewalls, said string means being connected with said rear end of said platform, said platform and said string means being mutually structured so that said pair of sidewalls and said feeder component assume said first orientation as a result of said biasing means when said platform is not depressed toward said base yet a wild animal placing at least a portion of its weight upon said platform causes said platform to depress toward said base so that said pair of sidewalls and said feeder component pivot on said axle means to said second orientation.

8. The wild animal feeder of claim 3, wherein each of said first and second sidewalls are shaped and decorated so as to provide a fanciful characterization.

9. The wild animal feeder of claim 8, wherein said feed dispensing means comprises trough means located substantially adjacent said generally forward end of said pair of sidewalls for holding the feed accessibly for one or more wild animals to eat.

10. The wild animal feeder of claim 9, wherein said characterization includes characterization legs, said characterization legs providing said pair of legs; further wherein said axle means comprises an axle pivotally connected with each leg of said pair of legs.

11. The wild animal feeder of claim 10, wherein said feed dispensing means further comprises aperture means for dispensing therethrough small grained feed accessibly for one or more wild animals to eat.

12. The wild animal feeder of claim 11, further comprising side extension means connected with said base for receiving the small grained feed emanating from said feed dispensing means.

13. The wild animal feeder of claim 10, further comprising mounting structure means connected with said base for supporting said base off the ground.

14. The wild animal feeder of claim 10, wherein said actuator means further comprises a platform having a forward end and a rear end, said forward end of said platform being pivotally connected to said base at a location remote from said generally forward end of said pair of sidewalls, said forward and rear ends of said platform being in alignment with respect to said generally forward end of said pair of sidewalls, said string means being connected with said rear end of said platform, said platform and said string means being mutually structured so that said pair of sidewalls and said feeder component assume said first orientation as a result of said biasing means when said platform is not depressed toward said base yet a wild animal placing at least a portion of its weight upon said platform causes said platform to depress toward said base so that said pair of sidewalls and said feeder component pivot on said axle means to said second orientation.

15. The wild animal feeder of claim 9, wherein said axle means comprises an axle having a first end and a second end; further wherein each leg of said pair of legs is interconnected with said axle via a respective mounting bracket located at each of said first and second ends thereof, each said mounting bracket having an axle bore for receiving one of said first and second ends of said axle, each said mounting bracket further having a leg bore for receiving a respective leg of said pair of legs.

16. The wild animal feeder of claim 15, wherein said feed dispensing means further comprises aperture means for dispensing therethrough small grained feed accessibly for one or more wild animals to eat.

17. The wild animal feeder of claim 16, further comprising side extension means connected with said base for receiving the small grained feed emanating from said feed dispensing means.

18. The wild animal feeder of claim 15, further comprising mounting structure means connected with said base for supporting said base off the ground.

19. The wild animal feeder of claim 15, wherein said actuator means further comprises a platform having a forward end and a rear end, said forward end of said platform being pivotally connected to said base at a location remote from said generally forward end of said pair of sidewalls, said forward and rear ends of said platform being in alignment with respect to said generally forward end of said pair of sidewalls, said string means being connected with said rear end of said platform, said platform and said string means being mutually structured so that said pair of sidewalls and said feeder component assume said first orientation as a result of said biasing means when said platform is not depressed toward said base yet a wild animal placing at least a portion of its weight upon said platform causes said platform to depress toward said base so that said pair of sidewalls and said feeder component pivot on said axle means to said second orientation.

20. The wild animal feeder of claim 15, wherein said characterization legs are pivotally connected with respect to said pair of sidewalls.

* * * * *